United States Patent
Hori et al.

(10) Patent No.: US 7,006,546 B2
(45) Date of Patent: Feb. 28, 2006

(54) GAS LASER ELECTRODE, LASER CHAMBER EMPLOYING THE ELECTRODE, AND GAS LASER DEVICE

(75) Inventors: Tsukasa Hori, Hiratsuka (JP); Junichi Fujimoto, Kanagawa (JP); Takayuki Yabu, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/795,401

(22) Filed: Mar. 1, 2001

(65) Prior Publication Data
US 2001/0050937 A1    Dec. 13, 2001

(30) Foreign Application Priority Data
Mar. 15, 2000 (JP) ............... 2000-072326

(51) Int. Cl.
*H01S 3/22* (2006.01)
(52) U.S. Cl. .............. 372/55; 372/57; 372/60
(58) Field of Classification Search ........ 372/55, 372/57, 29.013, 87, 60
See application file for complete search history.

(56) References Cited

U.S. PATENT DOCUMENTS

| | | | | |
|---|---|---|---|---|
| 3,719,884 A | * | 3/1973 | Laroche | 205/54 |
| 4,145,668 A | * | 3/1979 | Mastrup et al. | 372/97 |
| 4,856,019 A | * | 8/1989 | Miyata et al. | 372/57 |
| 5,181,217 A | * | 1/1993 | Sato et al. | 372/38 |
| 5,187,716 A | * | 2/1993 | Haruta et al. | 372/57 |
| 5,373,528 A | * | 12/1994 | Kuzumoto | 372/87 |
| 5,377,215 A | * | 12/1994 | Das et al. | 372/57 |
| 5,906,882 A | * | 5/1999 | Valente | 428/148 |
| 6,215,806 B1 | * | 4/2001 | Ohmi et al. | 372/57 |
| 6,414,979 B1 | * | 7/2002 | Ujazdowski et al. | 372/87 |
| 6,480,519 B1 | * | 11/2002 | Kakizaki et al. | 372/87 |
| 6,654,402 B1 | * | 11/2003 | Kakizaki et al. | 372/55 |

FOREIGN PATENT DOCUMENTS

| | | | |
|---|---|---|---|
| JP | 3194982 | | 8/1991 |
| JP | 03194982 A | * | 8/1991 |
| JP | 03231480 A | * | 10/1991 |
| JP | 4000775 | | 1/1992 |
| JP | 04000775 A | * | 1/1992 |

* cited by examiner

*Primary Examiner*—Minsun Oh Harvey
*Assistant Examiner*—Delma R. Flores-Ruiz
(74) *Attorney, Agent, or Firm*—Posz Law Group, PLC

(57) ABSTRACT

Provided is a gas laser electrode in which a stable laser output can be obtained by inhibiting the deterioration of the electrode (discharge characteristics). In an anode 3, a dielectric material 4 is applied on the surface of a discharging portion 3a in order to inhibit the deterioration of the electrode. Used as a dielectric material 4 may be, for example, fluorides such as calcium fluoride and strontium fluoride. Further, the dielectric material 4 is of a thickness (in a range of 0.005 mm~1.5 mm, preferably 0.1 mm~1 mm, for example) sufficient to prevent the erosion of halogen gas in the discharging portion 3a of the anode 3 and to secure a conductivity thereof, whereby it is enabled to form monofluoride evenly in extreme precision.

17 Claims, 6 Drawing Sheets

GAS LASER ELECTRODE, LASER CHAMBER EMPLOYING THE ELECTRODE, AND GAS LASER DEVICE

BACKGROUND OF THE INVENTION

1. Field of the Invention

The present invention relates to a gas laser electrode for exciting laser gas, a laser chamber employing such electrode, and a gas laser device.

2. Description of the Related Art

In a laser chamber of a typical gas laser device such as an excimer device, provided are primary ignition electrodes facing each other and arranged so as to sandwich an optical axis of a laser for exciting the laser gas filled inside the laser chamber and causing laser oscillation, and preionization electrodes for preionizing the space between the primary ignition electrodes so as to make the discharge of electricity between such electrodes easier. As the laser gas, for example, used may be a mixed gas of noble gas and halogen gas.

In this type of gas laser device, by the primary ignition electrodes being preionized with the preionization electrodes, laser gas is excited by the generation of electric discharge between the primary ignition electrodes, thereby causing laser oscillation. Moreover, as general knowledge, laser oscillation is stabilized when the electric discharge between the primary ignition electrodes is stable and, as a result, a stable laser output can be obtained thereby.

As examples of primary ignition electrodes to be employed in this type of gas laser device, known are those described in, for instance, Japanese Utility Model Application Laid-Open No. S61-1774764 (hereinafter referred to as "Document 1"), Japanese Patent Application Laid-Open No. S62-199078 (hereinafter referred to as "Document 2"), and Japanese Patent Application Laid-Open No. S63-227069 (hereinafter referred to as "Document 3").

With the primary ignition electrode described in aforementioned Document 1, in order to obtain large laser output, an insulator is adhesively coated on the side face areas excluding the primary ignition portion in the primary ignition electrode in order to prevent the generation of electric discharge between the primary ignition electrode and the arc discharge electrode (corresponds to the spare ionization electrode) even if the spacing between such primary ignition electrode and arc discharge electrode is shortened.

Further, with the primary ignition electrode described in aforementioned Document 2, a halogenous corrosion resistant resin layer is coated on a laser tube or at least a part of an electric discharge material in order to avoid the encounter of defects such as strong ultraviolet rays in the vicinity of the primary ignition electrode, corrosion of laser tube walls and electric discharge materials due to considerable generation of ions and electrons, deterioration of the filled gas, and so on.

Moreover, with the primary ignition electrode described in aforementioned Document 3, an insulator is applied to the end of the primary ignition electrode, for example, the end phase thereof, in order to obtain a stable glow discharge at the plane face of the center portion of the primary ignition electrode and suppress the dielectric breakdown and arcing at the primary ignition electrode end.

Further, as primary ignition electrodes other than those described in the aforementioned documents, known is a primary ignition electrode wherein dielectric thin film is applied to the cathode surface in the primary ignition electrode structured from an anode and cathode. Here, by applying a dielectric thin film to the cathode surface, the deterioration of the anode (deformation of electrode) caused by the impact of electric discharge is reduced by utilizing the phenomenon of the decrease in breakdown voltage.

Nevertheless, with the primary ignition electrodes described in aforementioned Documents 1~3, laser output characteristics would suddenly change and the maintenance of the initial characteristics becomes difficult a result of the deformation of the anode surface (deformation into a convex-concave shape) due to the impact of electric discharge and the transformation of the electrode due to halogenation of electrode materials caused by the erosion with halogen gas at the anode surface. In other words, it is not possible to obtain stable and desired laser output characteristics.

For example, with the primary ignition electrodes to be provided in the laser chamber employed in excimer laser devices such as a krypton fluorine (KrF) excimer laser or an argon fluorine (ArF) excimer laser, fluorine (F2) contained in the mixture of noble gas (krypton Kr, argon Ar) and halogen gas (fluorine F2) reacts with the discharging portion of the anode as a result of laser oscillation operation being repeated, and the anode is thereby halogenated (in this case, fluorinated). Simultaneously, the discharging portion of the anode deforms from a plane state to a convex-concave shape.

Thereby, problems would arise in that the electric discharge between the primary ignition electrodes becomes unstable, the output energy of the laser decreases and, as a result, desired laser output characteristics can not be obtained.

In order to overcome such problems, it is necessary to take measures such as raising the gas pressure in the laser chamber or raising the voltage to be applied between the primary ignition electrodes. Moreover, in particular cases, the deteriorated anode (or the primary ignition electrode) must be replaced, resulting in inefficient workability. Further, even if such deteriorated electrode is replaced with a new electrode, the aforementioned problems would similarly arise and, as a result, the cycle of replacing the electrode would occur frequently, resulting in increased maintenance costs.

Meanwhile, even with the primary ignition electrodes wherein a dielectric thin film is applied to the cathode surface thereof, as the discharging portion at which electricity is discharged between the anode and cathode is not coated, similar to the above, there is a problem in that stable laser output characteristics could not be obtained as a result of the deterioration of the anode (deformation of electrode) due to the impact of electric discharge, and the transformation of the electrode (anode) due to the halogenation (fluorination, for example) of the electrode materials.

SUMMARY OF THE INVENTION

Thus, an object of the present invention is to provide a gas laser electrode in which stable laser output can be obtained by inhibiting the deterioration of the electrode (discharge characteristics).

Another object of the present invention is to provide a laser chamber employing the gas laser electrode in which stable laser output can be obtained by inhibiting the deterioration of the electrode (discharge characteristics).

A further object of the present invention is to provide a laser device equipped with the laser chamber employing the gas laser electrode in which stable laser output can be obtained by inhibiting the deterioration of the electrode (discharge characteristics).

In order to achieve the first object described above, the first invention is a gas laser electrode comprising a cathode and an anode arranged so as to face each other, for exciting a laser gas by discharging electricity between these electrodes, wherein, at a region where the electricity is discharged between the cathode and the anode, the anode is coated with a dielectric material or an insulation material.

Further, the second invention is a gas electrode according to the first invention, wherein the dielectric material or the insulation material is formed in a thickness sufficient to prevent an erosion by the laser gas in the region and to secure a conductivity thereof Further, the third invention is a gas laser electrode according to the first or second invention, wherein the dielectric material or the insulation material is a dielectric material or an insulation material to which metal particulates are mixed.

The first to third inventions are now described with reference to FIG. 1.

With the gas laser electrode 1, the cathode 2 is formed with only metal material. Meanwhile, regarding the anode 3, although this will be described in detail later, the region 3a at which electricity is discharged between the cathode 2 and anode 3 (hereinafter referred to as "discharging portion") is coated with a dielectric material (or insulation material) 4 as shown in FIG. 1(a) in order to inhibit the deterioration of the electrode.

Fluoride is used as the material (dielectric material) for coating the anode 3 of the gas laser electrode 1 employed in the gas laser device adopting fluoric halogen gas. In addition, more preferable is a substance with low vapor pressure among such fluoride.

Specifically, used as the dielectric material 4 as the coating agent may be calcium fluoride (CaF2), strontium fluoride (SrF2), magnesium fluoride (MgF2), copper fluoride (CuF2), aluminum fluoride (AlF3), nickel fluoride (NiF3), cobalt fluoride (CoF3), ferric fluoride (FeF3), and so on. Moreover, among such fluorides, it is preferable to use CaF2 and SrF2 which are substances of low vapor pressure. Further, aluminum oxide (alumina=Al2O3) and aluminum nitride (AlN) having fluorine-resistive properties may also be used.

Further, the dielectric material 4 may be of a desired thickness in a range of, for example, 0.005 mm~1.5 mm, preferably 0.1 mm~1 mm (i.e., a thickness capable of discharging electricity between the cathode 2 and anode 3) capable of preventing the erosion of halogen gas in the discharging portion 3a of the anode 3 and securing the conductivity thereof, whereby mono-fluoride is evenly formed in extreme precision.

In addition, the dielectric material 4 may be of a film formed by mono-fluoride being evenly formed in extreme precision, or of a film formed with a mixed material wherein particulates of an electrode material (material having the same quality as the anode 3) for securing conductivity of the electrode or metal (copper, aluminum, cobalt, nickel, strontium, iron, etc.) having favorable conductivity but differing from the aforementioned electrode material are mixed with a dielectric material such as alumina (Al2O3), for example.

As described above, according to the first and second inventions, it is possible to conduct a stable electric discharge by inhibiting the erosion due to laser gas and deformation caused by the impact of electric discharge at the region to which electricity is discharged between the anode and cathode.

Moreover, according to the third invention, it is possible to secure the conductivity of the anode in comparison to the first and second inventions, and a more stable electric discharge may be conducted.

In order to achieve the objects described above, the fourth invention is a gas laser electrode according to the first or second invention, wherein the dielectric material or the insulation material is a dielectric material or an insulation material having pores.

The fourth invention is now described with reference to FIG. 3.

Figures 3A, 3B:
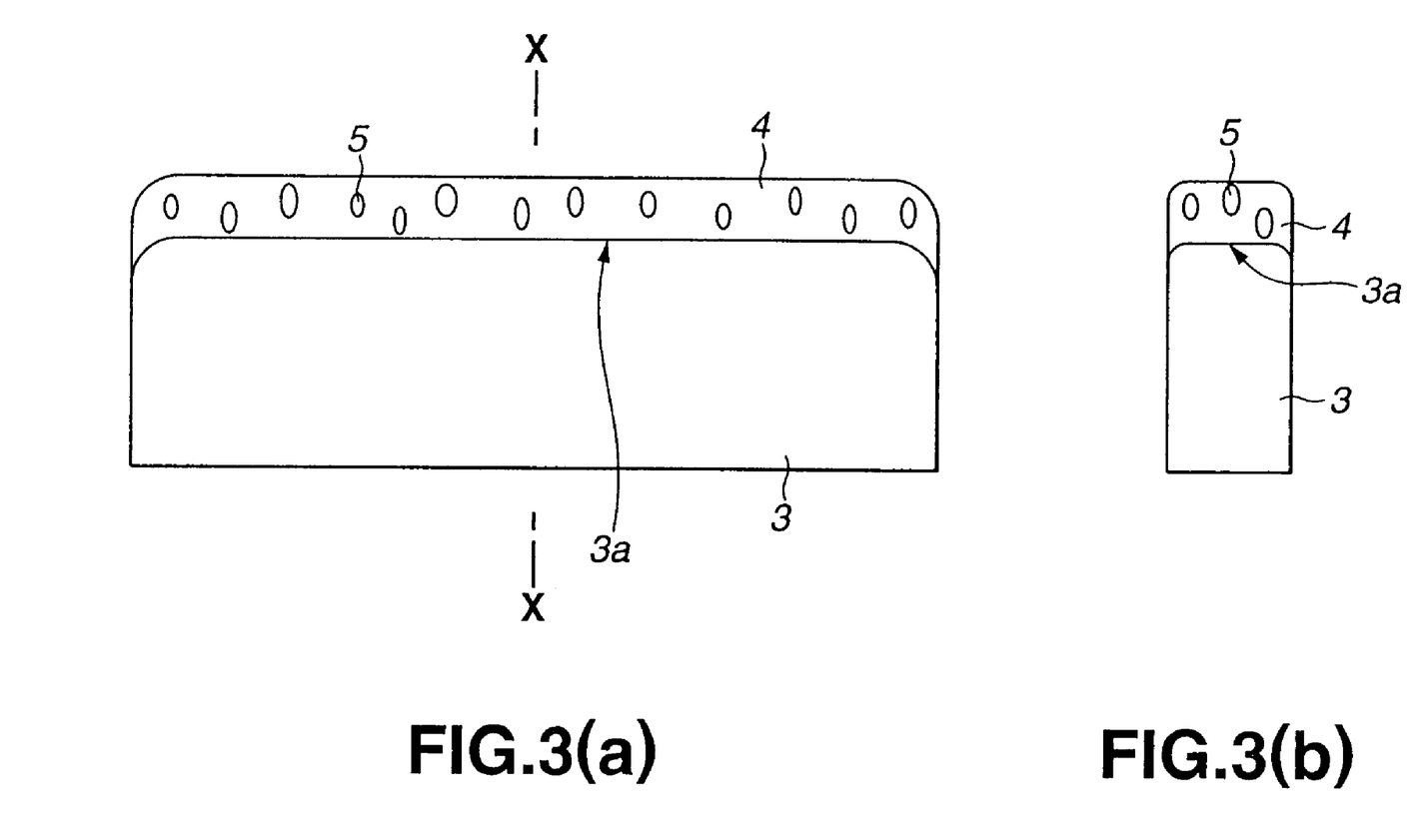
FIG. 3(a) is a cross section showing the principle section of the anode of the gas laser electrode as an application of the present embodiment.
FIG. 3(b) is the X—X line section in the anode shown in FIG. 3(a)

The dielectric material, as shown in FIG. 3, is formed of an even film having pores in which the diameter thereof is approximately 0.1 mm in order to secure the conductivity of the anode 3.

According to the fourth invention, similar to the third invention described above, it is possible to secure the conductivity of the anode in comparison to the first and second inventions, and a more stable electric discharge may be conducted.

Moreover, in order to achieve the objects described above, the fifth invention is a gas laser electrode comprising a cathode and an anode arranged so as to face each other, for exciting a laser gas by discharging electricity between these electrodes, wherein a single-element metal or an alloy forming a fluorine film is doped to an electrode material of the anode.

The fifth invention is now described with reference to FIG. 1.

A desired single-element metal, calcium (Ca) or strontium (Sr) for example, which is an element capable of forming a strong fluoride film, is doped to the anode 3 of the gas laser electrode 1 to be mounted on the laser chamber. Next, prior to the fluoride film being formed, the gas laser electrode 1 in a state where the aforementioned desired single-element metal is doped to the anode 3 is mounted on the laser chamber. Then, by applying a prescribed voltage between the cathode 2 and anode 3, electric discharge is generated between these electrodes in order to excite the laser gas, and laser is oscillated thereby.

When laser oscillation is conducted as described above, only the surface of the discharging portion 3a of the anode 3 is heated, and fluorination progresses faster in comparison to regions other than such discharging portion 3a (regions where electric discharge does not take place). As a result, a particularly thick fluoride film is formed at the surface of the discharging portion 3a of the anode 3. For instance, upon doping the aforementioned single-element metal (Ca or Sr), fluoride films such as calcium fluoride (CaF2) and strontium fluoride (SrF2) are formed.

As described above, according to the fifth invention, it is possible to obtain similar advantages as with the aforementioned first and second inventions.

Moreover, in order to achieve the second object described above, the sixth invention is a laser chamber employing the gas laser electrode according to any one of the first to fifth inventions.

The sixth invention is now described with reference to FIG. 1, FIG. 3, FIG. 4 and FIG. 6.

Figure 4A:
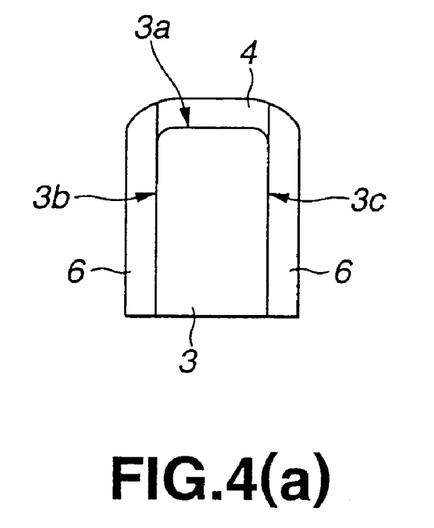
FIG. 4(a) and FIG. 4(b) are cross sections showing the principle portion of the anode in the gas laser electrode as an application of the present embodiment.
Figure 4B:
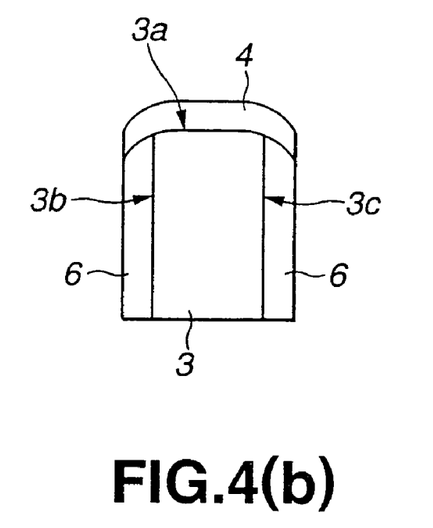
Figure 5:
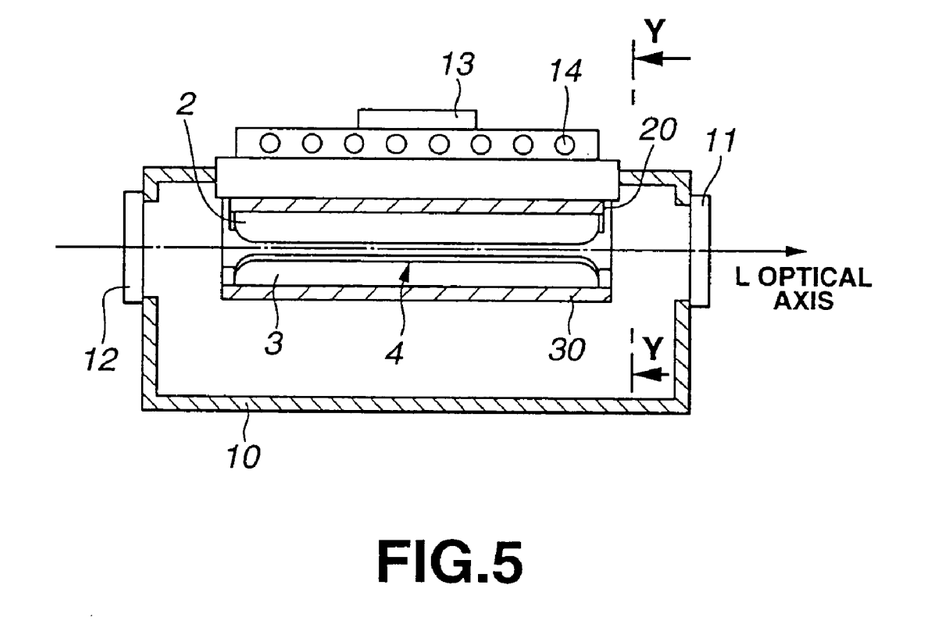
FIG. 5 is a cross section showing the principle portion of the laser chamber in the gas laser device employing the gas laser electrode of the present embodiment.

The laser chamber 10 is a container structured by coating a nickel plate on aluminum, for example. Inside this laser chamber 10, as shown in FIG. 5, provided is a pair of electrode holders 20 and 30 positioned to be mutually above and below while sandwiching the optical axis L. The electrode holder 20 holds the cathode 2 shown in aforementioned FIGS. 1(a) and (b), and the electrode holder 30 holds the anode 3 shown in aforementioned FIGS. 1(a) and (b), FIGS. 3(a) and (b), and FIGS. 4(a) and (b).

As described above, according to the sixth invention, provided is a laser chamber capable of conducting a stable electric discharge by inhibiting the erosion due to laser gas and deformation caused by the impact of electric discharge at the region to which electricity is discharged between the anode and cathode.

Moreover, in order to achieve the third object described above, the seventh invention is a gas laser device equipped with the laser chamber according to the sixth invention.

The seventh invention is now described with reference to FIG. 5 and FIG. 7. The gas laser device comprises the laser chamber 10 shown in FIG. 5 or FIG. 7.

As described above, according to the seventh invention, provided is a gas laser device capable of conducting a stable electric discharge by inhibiting the erosion due to laser gas and deformation caused by the impact of electric discharge at the region to which electricity is discharged between the anode and cathode.

DESCRIPTION OF THE PREFERRED EMBODIMENTS

The embodiments of the present invention are now described with reference to the attached drawings.

Figure 1A:
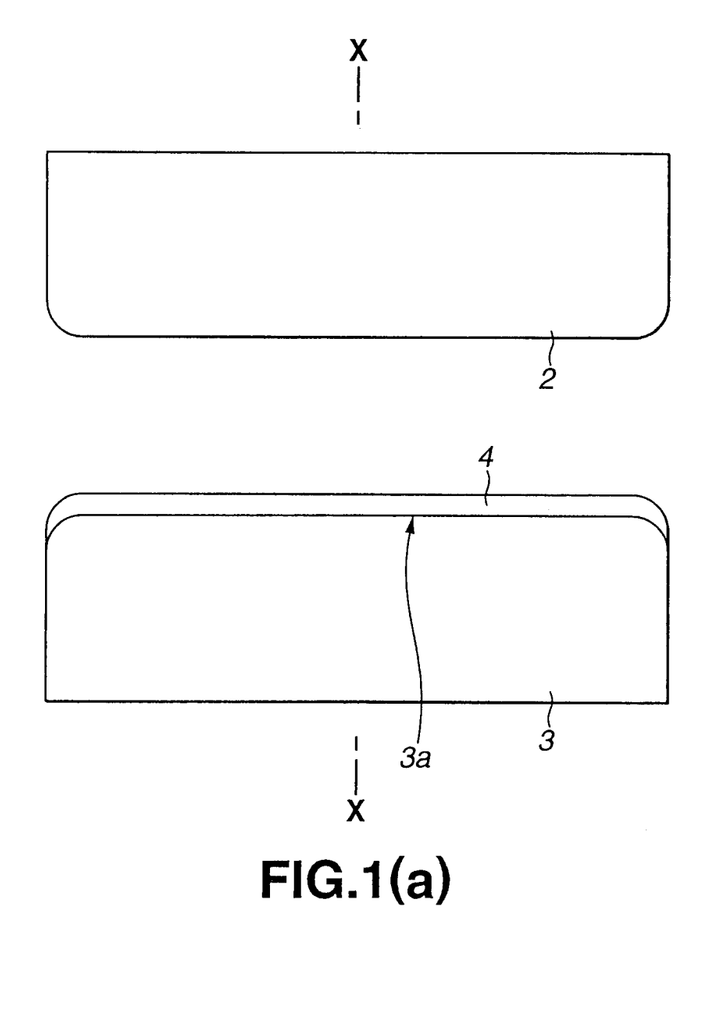
FIG. 1(a) is a cross section showing the principle section of the gas laser electrode according to the present embodiment.
Figure 1B:
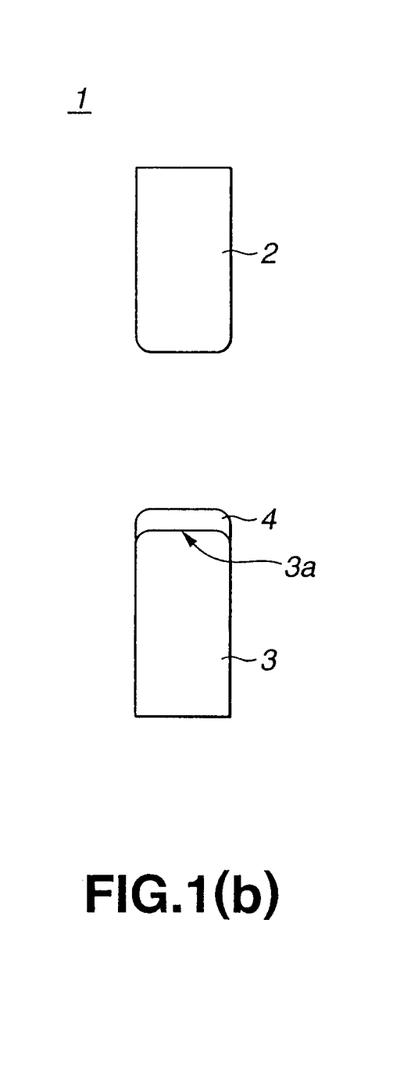
FIG. 1(b) is a cross section showing the X—X line section in the gas laser electrode shown in FIG. 1(a)

FIG. 1(a) is a cross section showing the principle section of the gas laser electrode according to the present embodiment, and FIG. 1(b) is a cross section showing the X—X line section in the gas laser electrode shown in FIG. 1(a).

The gas laser electrode 1 is formed of a cathode 2 and anode 3 as depicted in FIGS. 1(a) and 1(b), and these electrodes are arranged inside the laser chamber in a gas laser device, such as an excimer laser device, for example, so as to face each other while sandwiching the optical axis of the laser. The arrangement of the respective electrodes 2, 3 inside the laser chamber may be arranged in a relationship similar to those conducted conventionally and, here, such description is thereby omitted. Further, the gas laser device employing this gas laser electrode 1 will be explained later.

Meanwhile, filled inside the aforementioned laser chamber is, for example, mixed gas (krypton fluoride KrF, argon fluoride ArF) containing a noble gas (krypton Kr, argon Ar) and a halogen gas (fluoride F2), or mixed gas (xenon chlorine XeCl) containing a noble gas (xenon Xe) and a halogen gas (hydrogen chloride HCl).

With the gas laser electrode 1, the cathode 2 is formed with only metal material. Meanwhile, regarding the anode 3, although this will be described in detail later, the region 3a at which electricity is discharged between the cathode 2 and anode 3 (hereinafter referred to as "discharging portion") is coated with a dielectric material (or insulation material) 4 as shown in FIG. 1(a) in order to inhibit the deterioration of the electrode. Here, although either a dielectric material or insulation material may be used as the substance for coating, a dielectric material 4 will used for the description below.

Next, details of the coating processing to the anode 3 are explained. Here, the coating material, the thickness thereof, and its method will be described in order.

1: Coating Material

As the material to be used for the dielectric material 4, fluoride would be effective if the halogen gas to be filled in the aforementioned laser chamber is fluorine (fluorine F2), and chloride would be effective if such halogen gas to be filled is chlorine (hydrogen chloride HCl). The reason for this is that the deterioration of the discharging portion 3a of the anode 3 is mainly caused by transformation due to halogenation (fluorination in the case of fluorine) of the electrode material caused by the erosion of halogen gas (reaction between fluorine F2 and anode 3 in the case of fluorine).

Therefore, fluoride would be effective as the material; that is, the dielectric material 4, for coating the anode 3 of the gas laser electrode 1 employed in the gas laser device adopting fluoric halogen gas.

Specifically, used as the dielectric material 4 may be calcium fluoride (CaF2), strontium fluoride (SrF2), magnesium fluoride (MgF2), copper fluoride (CuF2), aluminum fluoride (AlF3), nickel fluoride (NiF3), cobalt fluoride (CuF2), ferric fluoride (FeF3), and so on. Moreover, among such fluorides, it is preferable to use CaF2 and SrF2 which are substances of low vapor pressure. Further, aluminum oxide (alumina=Al2O3) and aluminum nitride (AlN) having fluorine-resistive properties may also be used.

2: Thickness of Coating

Further, the dielectric material 4 is formed in a desired thickness (i.e., a thickness capable of discharging electricity between the cathode 2 and anode 3) capable of preventing the erosion of halogen gas contained in the discharging portion 3a of the anode 3 and securing the conductivity thereof In order to satisfy the aforementioned condition, this thickness is set to a desired value in a range of, for example, 0.005 mm~1.5 mm, preferably 0.1 mm~1 mm.

Needless to say, the thickness of the aforementioned dielectric 4 may be set to a desired value in an admissible range so as to satisfy the condition described above in accordance with the material used as the dielectric material.

3: Coating Method

As the method of coating the anode 3, employed may be a method (first method) of generating a thin film by the likes of thermal spraying, exposure, physical vapor deposition (PVD), chemical vapor deposition (CVD), plasma deposition, and so on, or a method (second method) of generating a fluoride film in a fluoric atmosphere by doping single-element metal or alloy to the electrode material.

As the single-element metal to be used as the dopant, preferred is an element capable of forming a strong fluoride film, for example, aluminum (Al), calcium (Ca), strontium (Sr), magnesium (Mg), copper (Cu), nickel (Ni), cobalt (Co), iron (Fe), and so on. It is desirable that the dopant ratio is 0.01~50% with respect to the parent material.

Here, the aforementioned second method is explained. In this second method, foremost, a desired single-element metal, calcium (Ca) or strontium (Sr) for example, which is an element capable of forming a strong fluoride film, is doped to the anode 3 of the gas laser electrode 1 to be mounted on the laser chamber. Next, prior to the fluoride film being formed, the gas laser electrode 1 in a state where the aforementioned desired single-element metal is doped to the anode 3 is mounted on the laser chamber. Then, by applying a prescribed voltage between the cathode 2 and anode 3, electric discharge is generated between these electrodes in order to excite the laser gas, and laser is oscillated thereby.

When laser oscillation is conducted as described above, only the surface of the discharging portion 3a of the anode 3 is heated, and fluorination progresses faster in comparison to regions other than such discharging portion 3a (regions where electric discharge does not take place). As a result, a particularly thick fluoride film is formed at the surface of the discharging portion 3a of the anode 3. For instance, upon doping the aforementioned single-element metal (Ca or Sr), fluoride films such as calcium fluoride (CaF2) and strontium fluoride (SrF2) are formed.

Although the aforementioned method is fluorinating the anode 3 in a state where the laser chamber and the gas laser electrode 1 to be mounted thereto form a pair, fluorination may be conducted to each gas laser electrode or anode subject to be fluorinated, similar to the above, in a special laser chamber for conducting fluorination processing. Then, after the coating is completed, the gas laser electrode or the anode is removed from the special laser chamber, and is mounted in a new laser chamber.

Here, characteristics representing the relationship between the laser output energy and number of pulses in the gas laser device employing the gas laser electrode 1 coated with the dielectric material 4 as described above is shown in FIG. 2.

Figure 2:
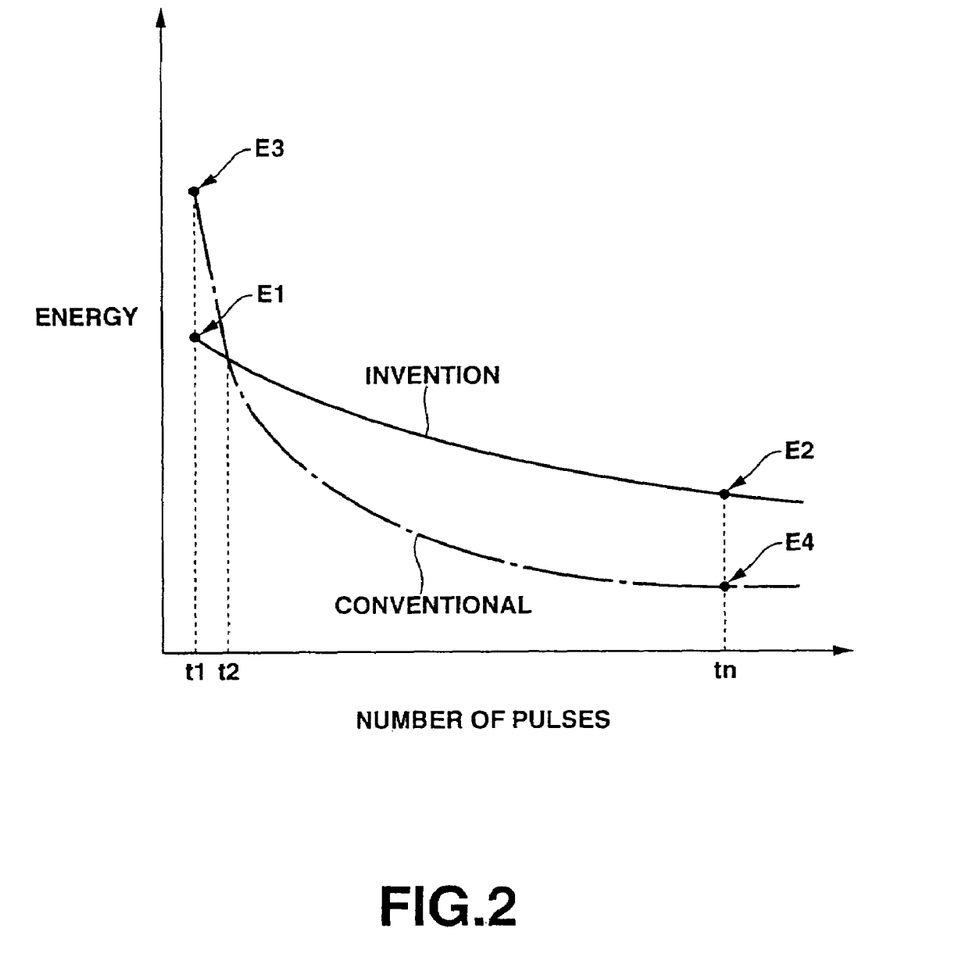
FIG. 2 is a graph showing the relationship between the laser output energy and number of pulses upon employing the gas laser electrode of the present embodiment.

In FIG. 2, the solid line shows the characteristics upon employing the gas laser electrode 1 of the present invention, and the dashed line shows the characteristics upon employing a conventional gas laser electrode (in which the discharging portion of the anode is not coated with the dielectric material).

Moreover, in FIG. 2, the following relationship is accomplished: number of laser pulses at time t1<number of laser pulses at time t2<number of laser pulses at time tn.

Upon employing the gas laser electrode 1 of the present invention, as clear from FIG. 2, the difference (in performance) between the initial characteristics of the laser at time t1; that is, the laser output energy E1, and the laser output energy E2 at time tn wherewith the number of laser pulses increased (i.e., the cumulative time of laser oscillation has increased) can be suppressed to be smaller in comparison to the difference between the output energy E3 at time t1 and the output energy E4 at time tn in the conventional case.

Moreover, the laser output energy itself, as clear from FIG. 2, is of a high output during the period from time t2 to time tn in comparison to conventional cases.

In other words, upon employing the gas laser electrode 1 of the present invention, it is possible to obtain a stable laser output for a long period of time.

The reason for this lies in that the discharging portion 3a is protected since the discharging portion 3a of the anode 3 is coated with the dielectric material 4 as described above.

Thus, the deformation of the discharging portion due to the impact of electric charge is inhibited, and the reaction between the anode 3 (discharging portion 3a) and the halogen gas (fluorine F2, for example) is inhibited (i.e., halogenation, fluorination for example, of the electrode material causing the erosion of halogen gas is inhibited). As a result, it is possible to inhibit the deterioration of the electrode (anode) resulting from the likes of transformation of the anode.

A stable electric discharge is thereby conducted between the cathode 2 and anode 3, laser oscillation is stabilized pursuant thereto, and a stable laser output is obtained as a result thereof.

Next, modification examples of the dielectric material 4 for coating the anode 3 are explained.

In other words, in the aforementioned embodiment, a dielectric material is formed of a film whereby monofluoride is evenly formed in extreme precision. Nevertheless, it is not limited thereto, and the dielectric material (or insulation material) 4 for coating the anode 3 for securing the conductivity of the electrode may be formed as follows.

(A): A Dielectric Material or Insulation Material to which Metal Particulates are Mixed.

For example, used as the dielectric material 4 may be a film formed with a mixed material wherein particulates of an electrode material (material having same quality as the anode 3) for securing the conductivity of the electrode or metal (copper, aluminum, cobalt, nickel, strontium, iron, etc.) having favorable conductivity but differing from the aforementioned electrode material are mixed with a dielectric material such as alumina (Al2O3).

(B): Dielectric Material or Insulation Material having Pores (Porus Structure).

The structure of the anode 3 in this case is shown in FIG. 3. FIG. 3(a) is a cross section showing the principle section of the anode of the gas laser electrode as an application of the present embodiment, and FIG. 3(b) is the X—X line section in the anode shown in FIG. 3(a).

As shown in FIGS. 3(a) and 3(b), in order to secure the conductivity of the electrode, used is a dielectric material 4 formed of an even film having pores 5 with a diameter of approximately 0.1 mm. The pores 5 do not have to penetrate the film. This is because dielectric breakdown will successively occur to the pores 5, as well as the portion of the film thinned due to the existence of such pores, and such portions of the film will attain conductivity.

As the conductivity of the dielectric material (film) 4 shown in FIG. 3(a) is secured due to the existence of pores 5, it can be formed somewhat thicker than the dielectric material (film) 4 shown in FIG. 1(a).

The anode 3 coated with the dielectric material described in aforementioned (A) and (B) is able to secure higher conductivity of the electrode (anode) in comparison to the anode 3 coated with the dielectric material 4 shown in FIG. 1.

Moreover, in the aforementioned embodiment, a dielectric material film is coated on the discharging portion 3a of the anode 3. Nevertheless, it is not limited thereto and, as shown in FIGS. 4(a) and 4(b), in addition to coating a dielectric material film on the discharging portion 3a of the anode 3, a film made from a material differing from the dielectric material or a complete insulation material film 6 may be coated on regions other than the discharging portion 3a; that is, side face portions 3b and 3c.

As described above, according to the present embodiment, by coating a dielectric material or an insulation material on the anode (positive electrode) of the electrode for exciting the laser employing halogen gas, influences (e.g., deterioration of discharge characteristics, deterioration of laser output characteristics, etc.) due to the deterioration of the anode can be suppressed to a minimum.

In other words, by priorly coating the discharging portion 3a (electrode surface) of the anode 3 with a dielectric material or an insulation material, it is possible to inhibit the transformation of the discharging portion 3a due to the erosion by halogen gas contained in the laser gas and the deformation of the discharging portion 3a due to the impact of electric discharge, which may occur in the anode 3. This means that the consumption of the anode 3 can be reduced, and it is thereby possible to obtain stable laser output characteristics (laser output) for a long period of time.

Moreover, as the deterioration of the discharging portion 3a of the anode 3 can be inhibited and the operating life of the electrode can be extended, it is possible to cut back on maintenance costs arising pursuant to the replacement of deteriorated anodes and so on.

Next, a gas laser device employing the aforementioned gas laser electrode 1 is described with reference to FIG. 5. Here, only the general description of the laser chamber to which the aforementioned gas laser electrode 1 is mounted will be explained.

The laser chamber 10 is a container structured by coating a nickel plate on aluminum, for example. Windows 11, 12 are respectively provided to both end faces opposing the optical axis L in the laser chamber 10. The windows 11, 12 function as the passage window of lasers in between the inside and outside of the laser chamber 10.

Inside this laser chamber 10, provided is a pair of electrode holders 20 and 30 positioned to be mutually above and below while sandwiching the optical axis L. The electrode holder 20 holds the cathode 2 shown in aforementioned FIGS. 1(a) and (b), and the electrode holder 30 holds the anode 3 shown in aforementioned FIGS. 1(a) and (b), FIGS. 3(a) and (b), and FIGS. 4(a) and (b). And, as clear from FIG. 5, the cathode 2 and anode 3 are arranged so as to face each other while sandwiching the optical axis L.

Shown in FIG. 5 are a terminal area 13 for connection with the power source and a peaking condenser 14 provided between the terminal area 13, and the cathode 2 and anode 3.

Figure 6:
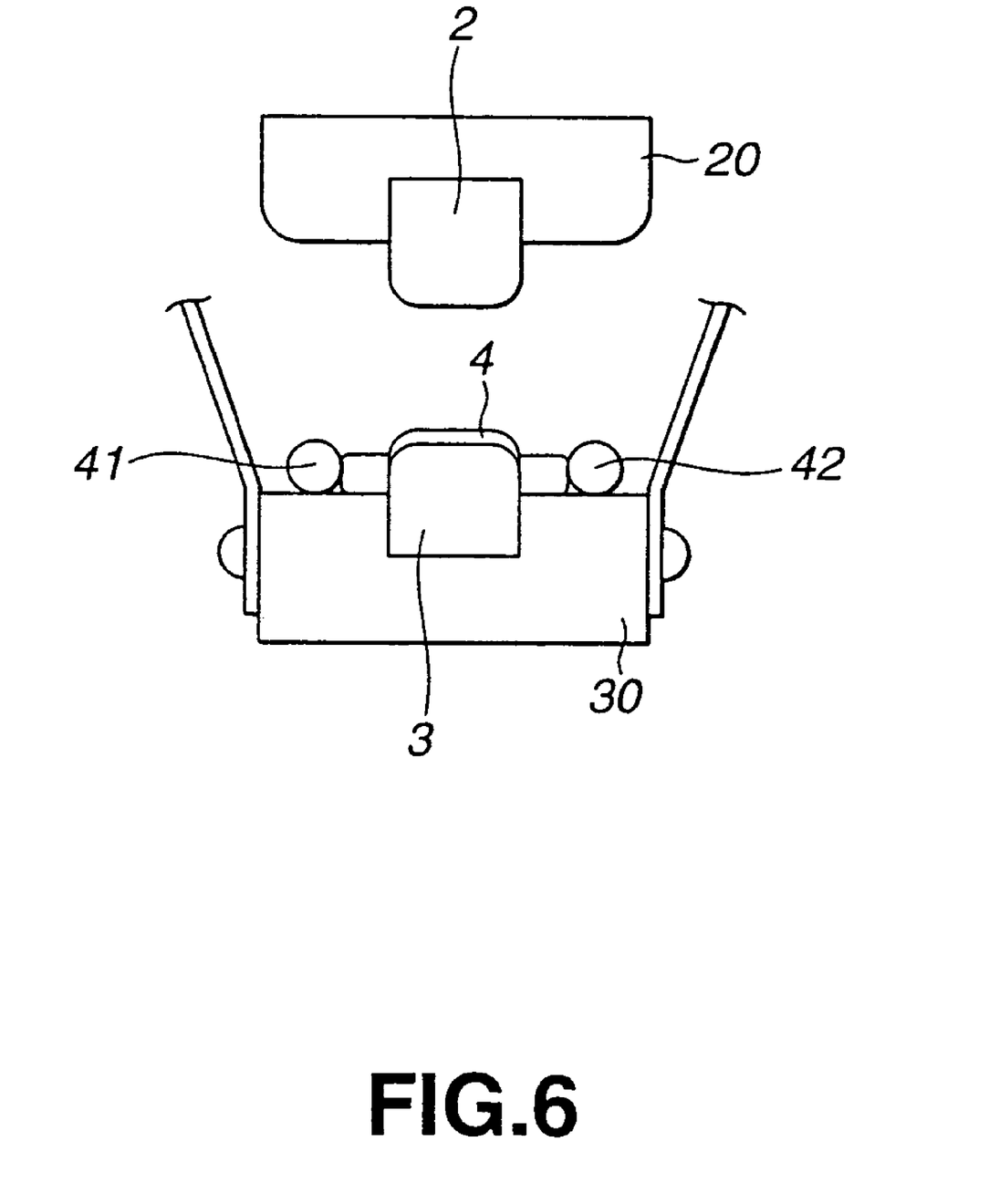
FIG. 6 is a cross section showing the Y—Y line section in FIG. 5.

Here, the section viewed from the Y—Y direction of FIG. 5 is shown in FIG. 6. In FIG. 6, the terminal area 13 and peaking condenser 14 are omitted. Moreover, shown are preionization electrodes 41, 42 or conducting preionization of laser gas.

Figure 7:
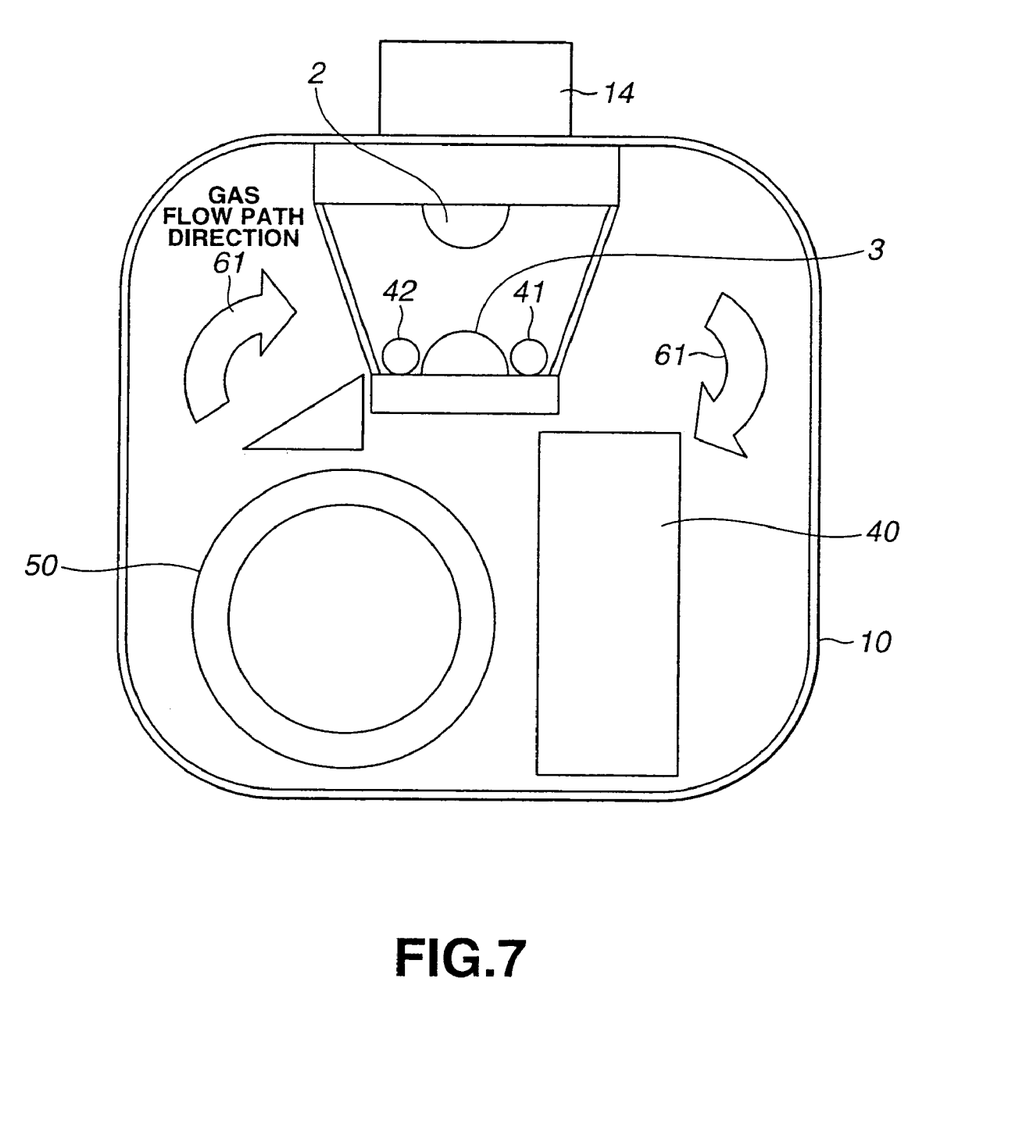
FIG. 7 is a cross section showing the principle portion of the laser chamber in another gas laser device employing the gas laser electrode of the present embodiment.

FIG. 7 shows the cross section of another gas laser device employing the aforementioned gas laser electrode 1, and corresponds to the cross section (refer to FIG. 6) viewed from the Y—Y direction of FIG. 5. Here, only the general description of the laser chamber to which the aforementioned gas laser electrode 1 is mounted will be explained. In FIG. 7, components yielding the same functions as though with the structural elements shown in FIG. 5 and FIG. 6 are given the same reference numerals.

The cooling unit 40 cools the laser gas in the laser chamber 10, the laser gas is circulated by rotating the fan 50, and gas is made to flow in the direction of the arrow 61 shown in FIG. 7.

What is claimed is:

1. A pair of electrodes comprising a cathode and an anode, arranged so as to face each other in a gas laser, and exciting a laser gas containing halogen gas by discharging electricity between the cathode and anode,
wherein, at a region where electricity is discharged between the cathode and the anode, the anode is coated with an erosion preventing material selected from the group consisting of a dielectric material and an insulation material.

2. A pair of electrodes according to claim 1, wherein the erosion preventing material is formed in a thickness effective for preventing erosion by the laser gas in the region and to secure a conductivity thereof.

3. A pair of electrodes according to claim 1, wherein the erosion preventing material is the dielectric material or the insulation material to which metal particles are mixed.

4. A pair of electrodes according to claim 1, wherein the erosion preventing material is the dielectric material or the insulation material having pores.

5. A pair of electrodes comprising a cathode and an anode, arranged so as to face other in an atmosphere of laser gas, for exciting the laser gas by discharging electricity between the cathode and the anode,
wherein the anode is doped with a member selected from the group consisting of single-element metal of Ca and an alloy of Ca and either one of Sr, Mg, Cu, Ni, Co, and Fe for forming a fluoride film of the doped metal on the surface of the anode.

6. A laser chamber employing the gas laser electrode according to any one of claims 1 to 5.

7. A gas laser device with the laser chamber according to claim 6.

8. A pair of electrodes according to claim 2, wherein the erosion preventing material is the dielectric material or the insulation material to which metal particles are mixed.

9. A pair of electrodes according to claim 2, wherein the erosion preventing material is the dielectric material or the insulation material having pores.

10. A pair of electrodes according to claim 1, wherein the dielectric material or the insulation material is formed in a thickness of 0.005 mm to 1.5 mm.

11. An excimer laser exciting a halogen-containing laser gas, which comprises a laser chamber containing the halogen-containing laser gas, and a cathode facing an anode, the cathode and the anode forming a region where the halogen-containing laser gas is excited by discharging electricity between the cathode and anode, the anode having a coating of an erosion preventing material in a thickness effective for preventing erosion by the halogen-containing laser gas in the region during the exciting of the halogen-containing laser gas and securing conductivity of the anode, the erosion preventing material being selected from the group consisting of dielectric material and an insulation material.

12. An excimer laser according to claim 11, wherein the erosion preventing material contains metal particles.

13. An excimer laser according to claim 12, wherein the erosion preventing material has pores.

14. An excimer laser according to claim 11, wherein an electrode material for the anode is doped with a fluorinated compound that is selected from the group consisting of fluorinated single-element metal and a fluorinated alloy.

15. An excimer laser according to claim 11, wherein the erosion preventing material is formed in a thickness of 0.005 mm to 1.5 mm.

16. An excimer laser according to claim 1, wherein the erosion preventing material comprises $CaF_2$.

17. An excimer laser according to claim 11, wherein the erosion preventing material comprises $CaF_2$.

* * * * *